United States Patent Office 3,468,961
Patented Sept. 23, 1969

3,468,961
PROCESS FOR THE PREPARATION OF ORTHOMERCAPTOPHENOLS
Emil J. Geering, Grand Island, and George B. Stratton, Lewiston, N.Y., assignors to Hooker Chemical Corporation, Niagara Falls, N.Y., a corporation of New York
No Drawing. Continuation-in-part of application Ser. No. 597,228, Nov. 28, 1966. This application Sept. 11, 1967, Ser. No. 666,915
Int. Cl. C07c *149/04, 149/32*
U.S. Cl. 260—609                                             13 Claims

ABSTRACT OF THE DISCLOSURE

Producing mercaptophenols in high yields by reducing a phenol-sulfide produced by reacting elemental sulfur and a phenolic reactant in the presence of a basic catalyst and carrying the reaction to a degree of completion at which the maximum number of moles of hydrogen sulfide evolved is up to about 33 percent of the number of moles of sulfur charged to said reaction.

SPECIFICATION

This is a continuation-in-part of application Ser. No. 597,228, filed on Nov. 28, 1966, now abandoned.

This invention relates to a novel method for preparing phenol-sulfides and to a novel process of preparation of orthomercaptophenol.

BACKGROUND

Prior to this invention, known processes which employ sulfur chloride as an initial reactant for the production of phenol sulfides in which phenol rings are linked by one or more sulfur atoms involved higher manufacturing costs than the process of this invention and were accompanied by certain problems. For example, sulfur chloride is the initial reactant in a known process, and may be more expensive than the sulfur reactant employed in the process of this invention. In conjunction with this, the condensation of phenol and sulfur monochloride or sulfur dichloride is accompanied by the formation of hydrogen chloride as a by-product. A process for preparing phenol-sulfides which includes the condensation of phenol and a sulfur chloride must also include, therefore, costly steps involving special materials of construction for handling this corrosive gas, unlike the disclosed process of this invention.

The prior art process employing sulfur chloride has a disadvantage of requiring an extra step, a sulfur chlorination step to produce sulfur chlorides as well as a step for disposing a corrosive by-product gas, hydrogen chloride.

The employment of sulfur halide is an initial reactant, to be reacted with the phenol, obtains a polyol which includes chlorine atoms attached to the aromatic ring and/or attached to the sulfur atoms; the chloride compounds may be corrosive. The phenolic intermediate utilized in this invention is produced by a process which has advantages over processes used to produce phenolic intermediates derived from a sulfur halide. The overall process of producing the phenolic sulfides of this invention which are derived from the base-catalyzed reaction of phenol and sulfur incorporates these advantages which include, for example, the lack of corrosive reagents or by-products, and lower manufacturing costs.

The reports of several authors concerning the relative positions of the sulfur and hydroxyl groups on the aromatic rings of these compounds have not been in agreement. L. Haitinger in 1883, Monatsh. Chem. 4, 165–175, obtained a phenol sulfide by heating a mixture of sodium phenate and sulfur. Apparently a minor portion of the acidified reaction mixture was collected as a steam distillate which contained the ortho isomer of mercaptophenol, for after neutralization and exposure to air the distillate deposited a salt of o,o′-dithiodiphenol, the oxidation product of o-mercaptophenol. In a more recent reference by C. Leferrer and C. Desgrez, Compt. rend. 198, 1432–4, 1791–3 (1934), both p,p′-thiodiphenol and p,p′-dithiodiphenol were prepared by heating a mixture of phenol, sulfur, glycerol and sodium carbonate. Thus, one could not predict from a knowledge of the chemical literature the substitution pattern of products derived from sulfur and phenol under basic conditions.

The structure of phenol sulfides produced according to the present invention differs significantly from phenol sulfides produced by sulfur-chloride processes of the prior art. The phenol sulfides prepared from phenol and sulfur chloride are, to a great degree, para substituted. This is demonstrated by several references in the literature in which the preparation of bis(p-hydroxyphenyl)sulfides by this route was reported. See, for example, Z. S. Ariyan and L. A. Wiles, J. Chem. Soc., 1962, 3876. Another difference between the condensation products of this invention and of sulfur halide is the number of sulfur atoms per polysulfide bond. The predominant bond is the monosulfide when the reagent is sulfur monochloride or sulfur dichloride (French Patent 1,369,616). Also, when the condensation is effected with elemental sulfur, the number of sulfur atoms can range from one to about seven. When prepared under the conditions of this invention, the phenol sulfides have an average of at least two sulfur atoms per linkage.

The o-mercaptophenol and o-mercaptoalkylphenols are useful multifunctional chemicals that have been obtainable only with difficulty. They are not offered commercially at the date of this application as they are not listed in the publication, "Chem. Sources," Directories Publishing Co., New York, N.Y., 1965, or in catalogues of chemical supply houses. They are not commercial chemicals because of the lack of a suitable technique for their manufacture at reasonable costs.

An o-mercaptophenol was first prepared by Haitinger as described above. A similar method of K. W. Palmer, U.S. 2,004,728, June 11, 1935, consists in heating a mixture of sodium phenate and sodium disulfide. The product was isolated by solvent extraction of the acidified mixture. No yields were recorded by either author and in the latter publication no physical properties other than its description as a greenish oil were given. These procedures were described by D. Greenwood and H. A. Stevenson, J. Chem. Soc., 1953, 1514–1519, as giving poor yields of a product that was difficult to purify. Their method of choice was a modification of a procedure described by P. Friedlander and F. Mauthner, Zeit. Farb. Text. Ind., 3, 333–337 (1904), which, in turn, was based on the work of R. Leuckart, J. Prakt. Chem., 41, 179–224 (1890), whereby o-hydroxyphenyl ethyl xanthate, from o-hydroxybenzene diazonium chloride and potassium ethyl xanthate, is converted to o-mercaptophenol. The prior art is in sharp contrast, therefore, to the present invention. Here, o-mercaptophenol of high purity is produced from low-cost starting materials by a straightforward procedure and in high yield.

K. W. Palmer disclosed in British Patent No. 381,237 a method of producing mercaptophenols by (a) a process of reacting phenol or chlorophenol and sodium sulfide, and (b) other processes of producing mercaptophenols from a disodium salt of p,p′-thiodiphenol.

It is an object of this invention to produce an ortho-substituted mercaptophenol reaction product.

Another object is to obtain a process for the production of high yields of an orthomercaptophenol reaction product.

Another object is to produce a high purity ortho-substituted phenolic sulfide having a high concentration of di- and/or polythio-linkages.

Another object is to avoid undesirable and complicating problems of known methods for the production of phenolic sulfides and mercaptophenols.

Other objects become apparent from the above and following disclosure.

DESCRIPTION OF THE INVENTION

The objects of this invention are obtained by the employment of elemental sulfur in reaction with a phenolic reactant, with a basic catalyst being employed in an amount ranging from at least a catalytic amount up to about 15 percent based on the number of moles of said phenolic reactant, said phenolic reactant having a molar ratio to said sulfur of from about 0.3 up to about 3, preferably up to about 2, at a temperature ranging from about 120° C. up to about 200° C. for a period of from at least about one hour 15 or more hours provided that said reaction is carried to a degree of completion (1) at which the maximum number of moles evolved of hydrogen sulfide is up to about 33% of the number of moles of sulfur charged into said reaction, and (2) at which said reaction is carried to completion sufficiently to produce a reaction product comprising phenol sulfide, and to completion sufficiently to produce said reaction product in which said phenol sulfide is of the structural formula:

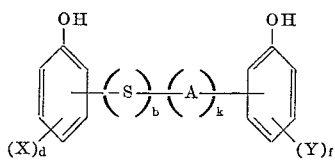

in which A is a phenol-sulfide group of the formula:

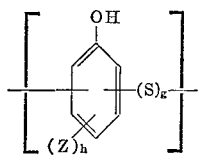

in which X, Y and Z are each selected from the group consisting of halogen, acyclic alkyl or alkoxy of 1 to about 18 carbon atoms, aryl, aryloxy, cyclic alkyl and hydroxy, in which $b$ and $g$ are each at least one up to about 7 (normally up to about 4 or 5) provided that the average number of sulfur atoms per sulfur-linkage for the sum of all sulfur atoms of $b+(k$ times $g)$ equals at least two sulfur atoms per linkage, in which $k$ ranges from zero up to about 3, in which each of $d$ and $f$ range from zero up to four, and $h$ ranges from zero up to three, provided for any of $d$, $f$ and $h$, that more than one the several members may be different, and provided that at least about 60% of the

bonds of all phenol-sulfide groups are ortho to at least one hydroxy group per phenol ring, and in which said reaction is substantially in the absence of a sulfur halide. The phenol sulfide molecules are thereafter reduced to mercaptophenol comprising at least about 60% of ortho-mercaptophenol.

As discussed above, the ortho-substituted phenol sulfides of this invention typically have an average of at least two sulfurs per linkage and therefore typically have a high sulfur content.

The sulfur radicals preferably have an average of two to seven connected sulfur atoms per sulfur linkage. The phenol sulfides of this invention may typically be employed as either a stabilizer or as a vulcanizing agent, or both, in rubber such as butadiene-styrene or butadiene-acrylonitrile, for example.

In the preferred embodiments of the above process of this invention, the preferred ranges are: a reaction temperature of at least about 140° C. up to not more than about 180° C.; a preferred catalyst level of from a catalytic amount up to substantially less than 2.0 percent, preferably up to 0.2% (on a molar basis of the phenol) is employed to obtain more than about 90% of the orthophenol sulfide of this invention; or alternatively a preferred catalyst level of from about 10% up to about 15% to obtain more than about 25% of the paraphenol sulfide; sodium hydroxide, potassium hydroxide, sodium phenate, sodium sulfide, and sodium polysulfide are the preferred catalysts; a phenolic-reactant/sulfur molar ratio is not more than about 1.2 in a preferred embodiment; the preferred period of reaction is at least about 5 to 8 hours at about 140° C. to about 180° C. and at less than 2% of catalyst, and the phenolic reactant is phenol or alkyl phenol; and X, Y and Z are preferably each non-halogen substituents. However, for the about 10% to the about 15% catalyst level, the preferred period of reaction is about 0.5 hour to about 5 hours, at preferably about 100° C. to about 150° C.

At the 2% level of catalyst, more than 80% of the reaction product is ortho-content, and at 0.2% or less, more than 90% is ortho-content.

The selectivity of the reaction of phenol and sulfur in giving ortho-substituted product is dependent on the concentration of basic catalyst; as the catalyst concentration is reduced, the proportion of ortho-substituted product increases.

Two differences between the two condensation products of a sulfur chloride and phenol, on one hand, and of sulfur and phenol when reacted under the conditions of this invention, on the other hand, are (1) number of sulfur atoms per sulfur bond, and (2) the isomer distribution.

The phenol —$S_2Cl_2$ reaction gives predominantly para substitution. After two molecules of phenol have been coupled at the para positions, the only available reactive sites remaining are ortho to the hydroxy group, and molecules having three or more phenol rings will have, of course, some ortho substitution.

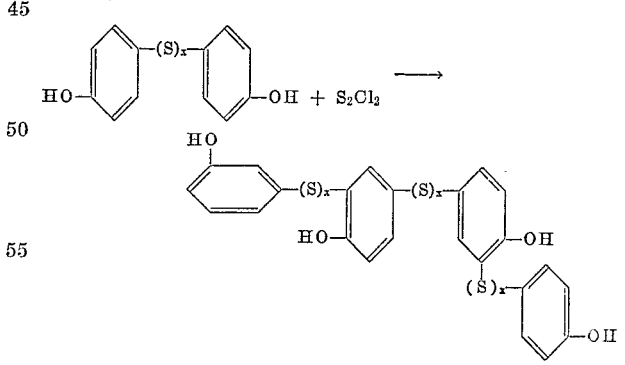

wherein $x$ averages less than two.

The maximum proportions (as percentages) of para substitution (assuming ortho plus para equals 100%) for phenol-sulfur chloride condensates containing two, three, six and eleven rings are 100, 75, 60 and 55, respectively. This series approaches 50% for a hypothetical polymer of infinite molecular weight. The phenol sulfides of this invention prepared in the presence of less than about 15 mole percent of a base catalyst, with respect to the phenolic reactant, are more than about 60% ortho-substituted.

When the phenol sulfide of this invention has at least two separate sulfur linkages, in a polymer having at least three phenolic rings, the entire polymer chain is substantially solely "ortho" such as when catalyst employed is less than about 0.2%, and may be typically represented as follows:

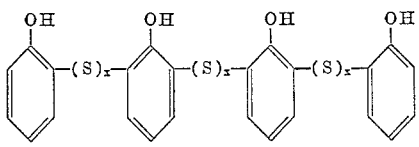

wherein $x$ averages at least two.

However, at higher catalyst levels or also if rearrangement takes place to at least some degree at higher temperature, the typical structure may modify to become partially "para," such as follows, for example:

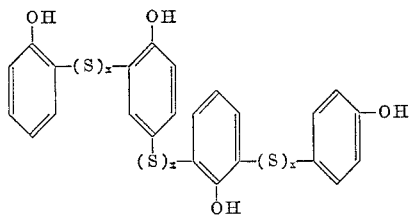

Examples of phenols which can be used in preparing the sulfur condensation products include phenol itself or substituted phenols having the following general formula:

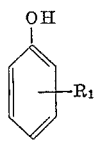

wherein R can be hydrogen, alkyl, alkoxy, or alkene groups of 1 to 18 carbon atoms, alicyclic groups of 5 to 18 carbon atoms, or aromatic, aryloxy, or aralkyl groups of 6 to 18 carbon atoms.

The phenols are characterized in that at least about 90 to 95 percent of the substituted phenols in the reaction mixture are substituted by hydrogen in at least one ortho position of the phenol nucleus, this site being thereby available for the condensation reaction. Suitable substituted phenols include p-tertiary-butylphenol, p-isooctylphenol, p-vinylphenol, p-phenylphenol, p-benzylphenol, p-methoxyphenol, p-cyclohexylphenol, p-nonylphenol, p-cumylphenol, p-phenoxyphenyl, p-chlorophenol, p-fluorophenol, p-bromophenol, as well as the corresponding ortho and meta derivatives such as meta-butylphenol and ortho-butylphenol, as well as mixtures thereof. Additional phenolic compounds include naphthols and polyhydric benzenes and naphthalenes, such as resorcinol, hydroquinone, catechol, dihydroxy naphthalene and phloroglucinol, also, compounds such as bisphenols, bisnaphthols, bishydroxyphenol ethers, and the like are contemplated herein.

By varying the ratio of phenol to sulfur of the initial charge, the functionality and molecular weight of the phenol sulfide can be varied.

The base-catalyzed reaction between phenol and sulfur is affected by the activity and concentration of the catalyst, the temperature at which the reaction is conducted, the duration of the reaction (time), and the ratio of the reactants.

When, during the course of the reaction, half of the charged sulfur is converted into hydrogen sulfide and half into monosulfide bonds, the maximum extent of reaction is reached. Although all of the sulfur may have been converted into polysulfide bonds when about 33% of the sulfur has been evolved as hydrogen sulfide, the reaction if continued will continue to evolve hydrogen sulfide until the polysulfide bonds are converted, with loss of sulfur—which reacts again with phenol or the phenolic substrate to monosulfide bonds.

In the following Table II of Examples V through XI, the extent of reaction, as measured by the quantity of hydrogen sulfide generated, is listed as percent reaction for each example.

Distillation is employed to remove at least a portion of the unreacted phenol from the reaction product. Distillation pressure is preferably in the range of 0.1 mm. Hg to atmospheric pressure or higher. If, because of insufficiently reduced pressure, the temperature of the distillation residue will approach, during the distillation, reaction temperature, the reaction mixture should be neutralized, for example, with hydrochloric acid, prior to the distillation step.

The basic catalysts which may be employed for the initial condensation reaction include elemental alkali metals, alkali or alkaline earth hydroxides, primary, secondary and tertiary amines, salts of strong bases and weak acids or alcohols, such as sodium acetate, sodium benzoate, sodium methylate, sodium sulfhydrate, aluminum isopropoxide, sodium thiosulfate, sodium sulfide, sodium tetrasulfide, sodium thiocyanate, and the like.

Other typical suitable catalysts include sodium, potassium, lithium, calcium and barium hydroxides; methyl, dimethyl, triethyl, and tripropyl amines, and the like.

The reduction to the mercaptophenols can be effected by several well-known methods. These typically include the action of metals and acid (nascent hydrogen), catalytic hydrogenation, and chemical reduction using alkali metal sulfides, for example. The preferred process is by hydrogenation.

Alkali metal sulfides reduce disulfides according to the equation:

(1) 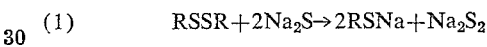

The present invention makes use of the reaction of sulfur present primarily as alkali or organic polysulfide, and caustic to generate the sodium sulfide required by the above equation.

(2) 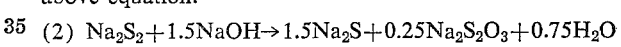

According to Equation 3, sodium hydroxide or other alkali or alkaline earth hydroxide is the sole reagent required to effect reduction of the bis(o-hydroxyphenyl) polysulfide.

(3) 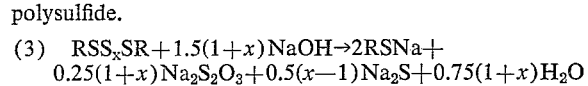

In Equations 1 and 3 R is the o-hydroxyphenyl radical.

Typical mercaptophenols and yields thereof prepared by the process of this invention are disclosed in Table I.

TABLE I

| Mercaptophenol: | Percent yield |
|---|---|
| 2-mercaptophenol | 71 |
| 2-mercapto-4-methylphenol | 61 |
| 2-mercapto-6-methylphenol | 20 |
| 2-mercapto-3,5-dimethylphenol | 25 |
| 2-mercapto-4-t-butylphenol | 71 |
| 2-mercapto-6-t-butylphenol | 68 |
| 2-mercapto-4,6-di-t-butylphenol | 59 |

Hydrogenation catalysts typically include sulfides of various metals, such as $CoS_2$, $Co_2S_3$, $CoS_3$, $MoS_2$, $MoS_3$, $MoS_4$, and the like, nickel polysulfide, iron polysulfide, chromium polysulfide, tungsten polysulfide, copper polysulfide, silver polysulfide, lead polysulfide, palladium sulfides and platinum sulfides, for example.

The orthomercaptophenols may be employed, for example, for any conventional use for mercaptophenols in general, such as a chemical intermediate, a polymerization modifier, etc.

The following examples serve to illustrate the invention but are not intended to limit it except to the extent the claims are limited. All parts are by weight and temperatures in degrees centigrade unless it is indicated otherwise.

Example I.—Preparation of o-mercaptophenol

Into a tared 5-liter flask, fitted with a stirrer, thermometer and condenser is charged 30 moles of phenol (2820 g.) and 1.5 g. of NaOH (0.125 mole percent of phenol).

Heating of the solution at 150° C. is started. At 120° C., 30 moles of sulfur flowers (sublimed sulfur) (960 g.) is added. The stirred reaction mixture is maintained at 150° C. until 5.25 moles of $H_2S$ (178 g.) are evolved. (A plot of $H_2S$ versus time, prepared as the reaction progresses, is a good method of keeping track of the reaction and of estimating its completion time. $H_2S$ is conveniently measured by periodically weighing the reactor.)

After the required amount of $H_2S$ has been expelled, the unreacted phenol is distilled off at 10 mm. until a pot temperature of 140° C. is reached. About 1900 g. of phenol will be collected. The residue of phenol sulfide weighs 1700 g. and contains 46.5% sulfur.

Example II

The product of Example I is transferred to a 12-liter flask fitted with a stirrer, gas inlet tube, thermometer and condenser. To the well-stirred residue is added 1560 grams of NaOH as a 33% solution.

The stirred nitrogen-purged basic solution is rapidly heated to 110° C., maintained at that temperature for 15 minutes and then rapidly cooled to 10–15°. During the cooling process sufficient cold water to reduce the caustic concentration to 25% is added.

Next, after adding 500 ml. of sec-butyl acetate, the stirred cold solution is brought to a pH of 3 by passing in $SO_2$. The temperature is kept below 15° during the acidification. The organic layer is separated and the aqueous layer is extracted with four 200 ml. portions of butyl acetate. The combined extracts are stripped of butyl acetate at aspirator vacuum to a pot temperature of 85°. The residue is flash distilled at aspirator vacuum (up and over) to give about 880 gm. of crude product, about 70% yield. Further purification is effected by fractionating the flash distillate through a 10-plate Oldershaw column. The main cut is collected at 90°/15 mm., is greater than 98% pure and has a refractive index $(n_D{}^{25})$ of 1.6100 to 1.616.

*Isomer distribution.*—In the following Example III, 92.3% of the distilled reduction product is orthomercaptophenol, the remainder is para. In this Example III, the sulfur-phenol reaction is conducted in the presence of 0.125 mole percent, relative to phenol, of NaOH.

On the other hand, when the reaction is catalyzed by a larger proportion of NaOH as in the following Example IV, where 12.5 mole percent of NaOH was used, the ortho and para percentages were 68 and 32, respectively.

Example III.—Preparation of o-mercaptophenol by hydrogenation

A stirred solution of 1880 g. of phenol (20 moles) 640 g. of sulfur flowers (20 moles) and 1.0 g. of NaOH is heated at 155° until 119 g. of hydrogen sulfide is evolved. This required 4–15 hours. After neutralizing the reaction mixture with mineral acid, it is stripped of phenol, 1217 g. at 20 mm. to a body temperature of 140° to leave a residue of 1173 g.

A portion of the residue, 500 g. is transferred, along with 33 g. of cobalt sulfide catalyst, to a one-liter stainless steel autoclave where it is stirred and heated at 125°. After purging with hydrogen, the autoclave is put under 1000–2000 pounds per square inch of hydrogen pressure. As the hydrogenation proceeds, the autoclave is periodically repressurized. When the hydrogen uptake ceases the autoclave is vented to remove hydrogen sulfide and hydrogen.

After filtering off the catalyst, the crude product is distilled, with no column, to give 272 g. of crude distillate and 74 g. of residue. The crude distillate is fractionally distilled through a 16 inch Vigreux column to give 241 g. of o-mercaptophenol of 90–95% purity and 20 g. of p-mercaptophenol, which corresponds to a total yield of about 65%.

Fractionation of the crude distillate through a four-foot distillation column packed with glass helices gave o-mercaptophenol of 99% purity.

Example IV.—Phenol and sulfur reaction—Increased catalyst level

A solution of 1800 g. (20 moles) of phenol, 640 g. of sulfur and 100 g. (2.5 moles) of sodium hydroxide is heated at 110–135° C. until about 120 g. (3.5 moles) of hydrogen sulfide is evolved. This requires about one and one-half hours. The reaction mixture is neutralized with hydrochloric acid and then filtered to remove sodium chloride. The filtrate is stripped of 1345 g. of aqueous phenol containing 200 g. of water. The residue is hydrogenated at 125° C. over cobalt sulfide catalyst under about 2000 pounds of hydrogen pressure. This requires 19 hours. The product is fractionally distilled to give 307 g. of o-mercaptophenol and 170 g. of p-mercaptophenol. The two isomers are produced in the ratio of 68 to 32 in a total yield of 54%.

Examples V through XI

Examples V through XI were conducted substantially the same as the initial condensation reactions of the preceding example, except that each was reacted for a period of twenty-seven hours. The reactants, the amounts thereof, the reaction temperature, and the percent of reaction was obtained (i.e., the quantity of hydrogen sulfide evolved as percent of charged sulfur) are disclosed in the following Table II.

TABLE II.—PERCENT OF PHENOL-SULFUR REACTION AFTER TWENTY-SEVEN HOURS

| | Catalyst | | | Mole ratio phenol/ sulfur | Ratio of sulfur atoms to sulfur bonds | Percent of reaction | Hydrogen sulfide percent of charged sulfur |
|---|---|---|---|---|---|---|---|
| | Mole percent | Weight | Basic material | °C. | | | |
| Example: | | | | | | | |
| V | 0.63 | 1.16 | $Na_2S_4$ | 155 | 0.45 | 4.3 | 38 | 19 |
| VI | 0.63 | 1.16 | $Na_2S_4$ | 170 | 0.44 | 2.9 | 51 | 16 |
| VII | 0.125 | 0.053 | NaOH | 150 | 1.0 | 3.7 | 43 | 22 |
| VIII | 0.5 | 0.213 | NaOH | 144–149 | 1.67 | 1.3 | 86 | 43 |
| IX | 0.5 | 0.213 | NaOH | 150 | 1.0 | 1.8 | 72 | 36 |
| X | 0.25 | 0.107 | NaOH | 150 | 1.0 | 2.3 | 61 | 31 |
| XI | 0.25 | 0.107 | NaOH | 155 | 0.5 | 5.2 | 32 | 16 |

Examples V and XI illustrate the comparable effectiveness of NaOH as a catalyst as compared with $Na_2S_4$. The effect of temperature is demonstrated by comparing Examples V and VI. Increasing the catalyst concentration will increase reaction rate, as shown in Examples VII and IX. The greater susceptibility of phenol as compared with the phenol-sulfur condensation product to reaction with sulfur is illustrated by the series of Examples VIII through XI where the ratio of phenol to sulfur in the reaction charge is changed. Increasing the ratio from 0.5 to 1.0 raises the hydrogen sulfide evolution from 16 to 31 percent of the charged sulfur. A further increase (at a different catalyst level) raises the hydrogen sulfide evolution from 36 to 43%.

Examples XII through XX

Examples XII through XX were each conducted substantially the same as Examples V through XI except for the changes disclosed in Table III.

Of the sulfide bonds, the monosulfide is the most stable as polysulfide bonds can be split by nucleophilic reagents. The phenol-sulfur condensation product when prepared for use as an intermediate orthopolyol for conversion to an aliphatic polyol by oxyalkylation, or to an epoxy resin therefore, should contain primarily monosulfide bonds. Monothiodiphenol, however, cannot be normally reduced to mercaptophenol. Therefore, to obtain the maximum yield of mercaptophenol, a phenol-sulfur condensation product having substantially no monosulfide bonds should be used.

These two alternative ends can be achieved by employing particular but different reaction conditions. The ratio of sulfur atoms to sulfur bonds is shown in the following Examples XII through XX, illustrated in Table III for phenol-sulfur condensation products made under several conditions but all in the presence of 0.125 mole percent of sodium hydroxide, relative to phenol. It should be noted that the higher temperatures and higher mole ratios of phenol to sulfur increase the yield of substantially monosulfide linkages. The phenol-sulfur condensation products usually contain unreacted sulfur. In general, the larger the percentage of sulfur in the product, the larger will be the quantity of free sulfur. In example XII where the ratio of sulfur atoms to sulfur bonds is one, no free sulfur is present. On the other hand, in runs similar to Example XX, two or three sulfur atoms may be chemically uncombined. In general, the number of chemically bound sulfur atoms per polysulfide bond will be less than the numbers listed in Tables II and III under the heading, "Ratio of sulfur atoms to sulfur bonds."

tion is 43%. However, only 19% of the chlorophenol reacts.

A similar experiment is conducted with p-chlorophenol. The data of these two experiments are compared with the corresponding results obtained with phenol in the following Table IV.

TABLE IV.—COMPARISON OF REACTIVITY OF PHENOL AND CHLOROPHENOLS

| Phenol | Catalyst | Mole percent | Hours | °C. | Percent Extent of Reaction | Percent Phenol Conversion |
|---|---|---|---|---|---|---|
| o-Chloro | NaOH | 2.8 | 15 | 170–176 | 42.8 | 18.5 |
| p-Chloro | NaSH | 2.3 | 25 | 155–185 | 38.2 | 19.3 |
| Unsubstituted | NaOH | 0.13 | 10 | 155 | 42.8 | 45 |

At the same extent of reaction, 43%, almost 2½ times more phenol had been converted than o-chlorophenol. This demonstrates the much lower reactivity of the chlorophenols as compared with phenol. Indeed, it is questionable if the reaction with chlorophenol proceeds in the same manner as with the more reactive phenols.

Vulcanizates prepared with butadiene-styrene or butadiene-acrylonitrile rubber, for example, and hydroxyphenyl sulfides or alkyl hydroxyphenylene sulfides are generally superior in modulus, tensile strength, tear resistance, resistance to flex-crack growth and retention of original properties on aging. The sulfides also function as tackifiers for butadiene-styrene rubber. The following Example XXII illustrates the utility of the phenol sulfide as a vulcanizing and stabilizing agent.

Example XXII

Samples of styrene-butadiene rubber were formulated with and without hydroxyphenylene polysulfide. After vulcanization several physical properties were determined. These properties were rechecked after an aging period at 100° C.

TABLE III.—ATOMS OF SULFUR IN PHENOLIC SUBSTRATE PER SULFUR BOND, AT 0.125 MOLE PERCENT OF NaOH

| | °C. | Hours of Reaction | Mole ratio Phenol/sulfur | Ratio of Sulfur Atoms to Sulfur Bonds | Hydrogen Sulfide Percent of Charged Sulfur | Percent of Reaction |
|---|---|---|---|---|---|---|
| Example: | | | | | | |
| XII | 172–186 | 11 | 2.0 | 1.0 | 49 | 98 |
| XIII | 150–181 | 9 | 2.0 | 1.4 | 40 | 80 |
| XIV | 160 | 4 | 2.0 | 2.4 | 30 | 59 |
| XV | 161 | 3.5 | 2.0 | 3.1 | 25 | 50 |
| XVI | 155 | 200 | 1.0 | 1.2 | 45 | 90 |
| XVII | 155 | 27 | 1.0 | 2.6 | 28 | 56 |
| XVIII | 155 | 12 | 1.0 | 3.4 | 23 | 45 |
| XIX | 155 | 6 | 1.0 | 4.6 | 18 | 35 |
| XX | 155 | 3 | 1.0 | 6.3 | 14 | 27 |

Example XXI.—Reaction of chlorophenol and sulfur

An equimolar solution of o-chlorophenol and sulfur containing about three mole percent of NaOH with respect to phenol, is heated 15 hours at 170–175° C. The extent of reaction as indicated by hydrogen sulfide evolu- The vulcanizing and stabilizing action of the hydroxyphenylene polysulfide is illustrated by the data of the following Table V. The ratio to sulfur atoms in the hydroxyphenylene polysulfide mixture to polysulfide bonds was five.

TABLE V.—EVALUATION OF ORTHO HYDROXYPHENYLENE SULFIDE IN SBR

| | Control | | Test | |
|---|---|---|---|---|
| Styrene-butadiene rubber (parts) | 100 | | 100 | |
| Carbon black | 40 | | 40 | |
| Processing oil | 10 | | 10 | |
| ZnO | 3 | | 3 | |
| Stearic acid | 2 | | 2 | |
| Sulfur | 2 | | | |
| Accelerator | 1.2 | | 1.2 | |
| Hydroxyphenylene sulfide | | | 5 | |
| Vulcanization time, min. 140° C | 10 | 20 | 10 | 20 |
| Hardness, Shore $A_2$ | 65 | 65 | 67 | 67 |
| 300% modulus, p.s.i | 950 | 960 | 1,060 | 1,280 |
| Elongation, percent break | 630 | 590 | 630 | 580 |
| Tensile strength, p.s.i | 3,130 | 2,730 | 3,310 | 3,170 |
| Seven day aging 100° C.: | | | | |
| Hardness, Shore $A_2$ | 84 | 84 | 83 | 84 |
| Elongation, percent retention | 17 | 17 | 28 | 30 |
| Tensile strength, percent retention | 47 | 56 | 66 | 75 |

For purposes of scope of invention, it should be noted the reduction products of phenol sulfide containing more than two phenolic units per chain, and also containing polysulfide bonds, will include products containing two mercaptan groups. For example, o,o'-dimercaptophenol, as well as o-mercaptophenol, will be produced on reducing o,o'-bis(o-hydroxyphenylpolythio)phenol.

We claim:

1. A process for the production of mercaptophenol comprising reacting sulfur with a phenolic reactant in the presence of a basic catalyst in a molar amount ranging from at least a catalytic amount up to about 15 percent based on the number of moles of said phenolic reactant, at a temperature from about 100 degrees centigrade to about 200 degrees centigrade, terminating said reaction before the number of moles of hydrogen sulfide gas evolved exceed about 33 percent of the number of moles of sulfur charged into said reaction, thereby producing a phenol sulfide having about 2 sulfur atoms to about 7 sulfur atoms per linkage connecting each of a pair of hydroxy-substituted rings of said phenol sulfide, reacting said phenol sulfide with a reducing agent to produce mercaptophenol.

2. A process according to claim 1, including the step of initially reacting (1) substantially sulfur-halide-free elemental sulfur with (2) a phenolic reactant, in intimate contact with (3) a basic catalyst in a molar amount ranging from at least a catalytic amount up to about 15% based on the number of moles of said phenolic reactant, said phenolic reactant having a molar ratio to said sulfur of from about 0.3 up to about 3, at a temperature ranging from about 120° C. up to about 200° C. for a period of at least about one hour, provided that said initial reacting is sufficient to form said phenol sulfide and that said initial reacting is terminated at least before the number of moles of hydrogen sulfide gas evolved exceed about 33% of the number of moles charged, said phenol sulfide being characterized by the formula:

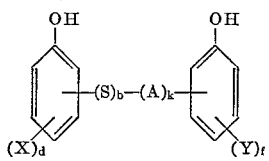

in which A is a phenol-sulfide group of the formula:

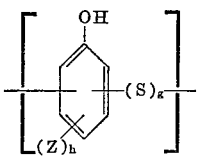

in which X, Y and Z are each a member selected from the group consisting of (a) halogen, (b) acyclic alkyl or alkoxy or alkene, each of one to about 18 carbon atoms, (c) aryl, (d) aryloxy, (e) cyclic alkyl, and (f) hydroxy, in which $b$ and $g$ are each at least one up to about 7, provided that the average number of sulfur atoms per sulfur-linkage for the sum of all sulfur atoms of $b+(k$ times $g)$ equals at least two up to seven sulfur atoms per linkage, in which $k$ ranges from zero up to about 3, in which each of $d$ and $f$ range from zero up to four and $h$ from zero up to three provided that when more than one the members may be different, and in which said 60% of said sulfur-linkages are each ortho to at least one hydroxy group of an adjacent adjoining phenolic ring.

3. A process according to claim 2, in which said reducing comprises reacting a metal and an acid sufficiently to produce nascent hydrogen, and said period of initial reacting ranges from about 5 hours up to about 8 hours.

4. A process in accordance with claim 1, wherein about 0.3 to about 3 moles of phenolic reactant are used per mole of sulfur.

5. A process in accordance with claim 4, wherein the phenol sulfide is characterized by the formula:

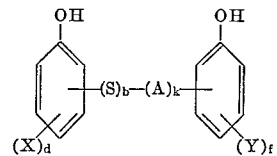

in which A is a phenol-sulfide group of the formula:

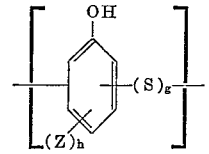

in which X, Y, and Z are each selected from the group consisting of (a) halogen, (b) acyclic alkyl or alkoxy or alkene, each of 1 to about 18 carbon atoms, (c) aryl, (d) aryloxy, (e) cyclic alkyl and (f) hydroxy, in which $b$ and $g$ are each at least one up to about 7, provided that the average number of sulfur atoms per sulfur-linkage for the sum of all sulfur atoms of $b$ plus($k$ times $g$) equals at least two up to seven sulfur atoms per linkage, in which $k$ ranges from zero up to about 3, in which $d$ and $f$ each range from zero up to four and $h$ from zero up to three provided that for any of $d$, $f$ and $h$, that more than one of the X, Y, and Z members may be different, and provided that at least about 60 percent of said sulfur-linkages are ortho to at least one hydroxy group per phenol ring.

6. A process in accordance with claim 5, wherein said reducing comprises catalytic hydrogenation.

7. A process in accordance with claim 5, wherein said reducing comprises the employment of an alkali metal sulfide.

8. A process in accordance with claim 5 wherein said reducing comprises reacting a metal and acid sufficiently to produce nascent hydrogen.

9. A process in accordance with claim 5, wherein the basic catalyst is used in an amount from a catalytic amount to less than 2 percent.

10. A process in accordance with claim 9, wherein the phenolic-reactant to sulfur molar ratio is not more than about 2 and the reaction of sulfur with the phenolic reactant is carried out at a temperature of about 140 degrees centigrade to about 180 degrees centigrade.

11. A process according to claim 9, in which said reducing comprises the employment of an alkali metal sulfide comprising sodium sulfide, and said period of initial reacting ranges from about 5 hours up to about 8 hours.

12. A process in accordance with claim 5, wherein the basic catalyst is used in an amount from about 10 percent to about 15 percent.

13. A process in accordance with claim 12, wherein the phenol-reactant to sulfur molar ratio is not more than about 2 and the reaction of sulfur with the phenolic reactant is carried out at a temperature of about 100 degrees centigrade to about 150 degrees centigrade.

References Cited

UNITED STATES PATENTS

| | | | |
|---|---|---|---|
| 1,435,801 | 11/1922 | Blumfeldt | 260—48 |
| 2,605,289 | 7/1952 | Daniels et al. | 260—608 XR |
| 3,133,972 | 5/1964 | Handlouits et al. | 260—608 XR |

OTHER REFERENCES

Greenwood: "J. Chem. Soc." (1953), 1514–19.

CHARLES B. PARKER, Primary Examiner

D. R. PHILLIPS, Assistant Examiner

U.S. Cl. X.R.

260—23.7, 44.5, 79.5, 608

PO-1050
(5/69)

UNITED STATES PATENT OFFICE
CERTIFICATE OF CORRECTION

Patent No. 3,468,961   Dated September 23, 1969

Inventor(s) Emil J. Geering and George B. Stratton

It is certified that error appears in the above-identified patent and that said Letters Patent are hereby corrected as shown below:

Column 1, line 53, delete "is" and insert --- as ---;

Column 3, line 20, delete "hour 15" and insert --- hour to about 15 ---;

Column 3, line 54, delete "f range" and insert --- f each range ---.

SIGNED AND
SEALED
OCT 6 - 1970
1970

(SEAL)
Attest:

Edward M. Fletcher, Jr.
Attesting Officer

WILLIAM E. SCHUYLER, JR.
Commissioner of Patents